United States Patent
Gründken et al.

[11] 4,074,804
[45] Feb. 21, 1978

[54] SCRAPER-CHAIN CONVEYORS

[75] Inventors: Dieter Gründken, Lunen; Helmut Temme, Waltrop, both of Germany

[73] Assignee: Gewerkschaft Eisenhutte Westfalia, Wethmar bei Lunen, Germany

[21] Appl. No.: 673,486

[22] Filed: Apr. 5, 1976

[30] Foreign Application Priority Data

Apr. 12, 1975 Germany .............................. 2516082
July 17, 1975 Germany .............................. 2531861

[51] Int. Cl.² .............................................. B65G 19/28
[52] U.S. Cl. .................................. 198/735; 198/860
[58] Field of Search ............... 198/168, 204, 735, 860, 198/861, 862; 299/43, 64

[56] References Cited

U.S. PATENT DOCUMENTS

| | | | |
|---|---|---|---|
| 2,804,193 | 8/1957 | Zeegers | 198/204 |
| 3,300,031 | 1/1967 | Dommann et al. | 198/204 |
| 3,367,718 | 2/1968 | Hauschopp | 198/204 X |
| 3,455,432 | 7/1969 | Dawson | 299/43 X |
| 3,625,567 | 12/1971 | Blümenthal et al. | 198/204 X |
| 3,752,299 | 8/1973 | Blümenthal et al. | 198/204 |
| 3,784,256 | 1/1974 | Katlic | 299/43 X |
| 3,787,090 | 1/1974 | Hauschopp et al. | 299/43 |
| 3,842,966 | 10/1974 | Blumenthal et al. | 198/204 X |
| 3,957,311 | 5/1976 | Rösler et al. | 198/204 |
| 3,960,265 | 6/1976 | Temme et al. | 198/204 |

FOREIGN PATENT DOCUMENTS

| | | | |
|---|---|---|---|
| 1,533,803 | 7/1970 | Germany | 198/204 |
| 1,128,806 | 4/1962 | Germany | 198/204 |
| 1,802,352 | 5/1970 | Germany | 198/204 |
| 1,132,567 | 11/1968 | United Kingdom | 198/204 |
| 768,559 | 2/1957 | United Kingdom | 198/204 |
| 1,239,015 | 7/1971 | United Kingdom | 198/204 |

*Primary Examiner*—John J. Love
*Assistant Examiner*—Richard K. Thomson
*Attorney, Agent, or Firm*—Thompson, Birch, Gauthier & Samuels

[57] ABSTRACT

A channel section for a scraper-chain conveyor is reinforced on one or both of its side walls by means of an assembly which may be a one-piece component with elongate members mounted one above another and secured to the associated side wall to lie flush with the upper and lower surfaces of the latter. The members are connected by means of transverse brackets provided with slotted recesses which are shaped to receive the heads of bolts and the members themselves are also provided with recesses for receiving the heads of bolts or attachments. The bolts can secure attachments such as plates or guides to the channel section. Connectors which enable the channel section to be connected to other channel sections are provided at the ends thereof. These connectors and the brackets engage within a V-shaped longitudinal groove at the outside of the side wall.

11 Claims, 3 Drawing Figures

SCRAPER-CHAIN CONVEYORS

BACKGROUND TO THE INVENTION

The present invention relates in general to scraper-chain conveyors. As is known such conveyors are often employed in mine workings and usually the conveyors are composed of a series of channel sections or pans which are arranged end-to-end and interconnected with one another. The connections between the individual channel sections are usually designed to permit some angular mobility between the ends of adjacent channel sections. It is also known to provide means, such as brackets welded to the side walls of the channel sections, for carrying other accessories or attachments, for example spillage or guard plates or machine guides. During operation the channel sections and their connections can be subjected to very high loads which in some circumstances can cause deformation or fracture. This is particularly so where the conveyor is connected through shifting rams to roof supports.

A general object of this invention is to provide an improved construction for the channel sections and more particularly to provide an assembly which can reinforce the channel sections and enable a variety of attachments to be secured thereto.

SUMMARY OF THE INVENTION

In one aspect the invention provides as assembly for securing to the side wall of a channel section of a scraper-chain conveyor; the assembly comprising elongate members with a length substantially the same as the side wall and having upper and lower surfaces which are spaced to be co-planar with the upper and lower surfaces of the side wall when secured thereto, transverse means interconnecting the elongate members and means for connecting attachments to the assembly.

The invention also provides a channel section for a scraper-chain conveyor; said channel section comprising side walls interconnected by a floor plate, elongate members mounted to the exterior of at least one of said side walls, said elongate members extending over substantially the length of the side wall and being substantially co-planar with the upper and lower surfaces of said side wall and means for connecting at least one attachment to said side wall. Assemblies composed of the elongate members and other parts can be secured, as by welding, to both side walls of a channel section so as to increase the overall width thereof and reinforce the channel section.

Bracket-like holders can be mounted between the elongate members in the manner of webs and these holders can have slotted recesses adapted to accommodate the heads of bolts used to secure one or more attachments.

Preferably the elongate members also have recesses for receiving attachments or for receiving the heads of bolts. Preferably the recesses in the uppermost members are open towards the top and bottom and towards the outer side face and are wider inwardly of the outer side face whereas the recesses in the lowermost member are just open towards the top and bottom. In this way the heads of bolts can be received in the recesses of the uppermost member and portions of attachments can be inserted into the recesses of the lowermost member. The attachments can thus be secured with the bolts and/or by engagement in the lower recesses instead of directly to the side wall.

Conventional channel sections have V-shaped grooves extending along the exterior of their side walls and the holders can engage within the groove of the associated side wall and may have outer faces flush with the outer side faces of the elongate members. In all cases the means for connecting the attachments are considerably stronger than the means used hitherto.

Preferably connectors of greater strength than the known connectors are provided at the ends of the channel sections. These connectors have a complementary interengaging projection and recess, as is known, and permit the channel section to be mated and secured to the other channel section. The connectors have bores for receiving connection bolts and can engage within the V-shaped groove of the side wall associated therewith. The connectors can have a height commensurate with the side wall and a width such as to lie flush with the outerside faces of the elongate members. This increased size then provides the increased strength. Additional holders of small conventional design can also be employed if desired. These holders would be mounted directly to the side wall and within the V-shaped groove thereof and disposed adjacent the connectors. The additional holders preferably do not project beyond the outer side face of the side wall and hence do not obstruct the fitting of the connection bolts into the bores of the connectors.

The elongate members and other parts may form a prefabricated assembly welded to the side wall or alternatively the parts of the assembly can be attached individually to the side wall.

In one form the elongate members comprise sections of a one-piece component structure which are interconnected by means of transverse sections spaced apart along the members.

Preferably this component structure is symmetrical about a centre line parallel to the longitudinal axis of the side wall permitting its inversion. The structure can be conveniently manufactured by drop forging or casting.

The component structure can be formed with connection means analogous to the aforementioned connectors. The recess for receiving the projection of the connector at one end of the component can then be defined between the elongate section and an endmost transverse section. Preferably both endmost transverse sections have projections which engage in the V-shaped groove of the side wall. These projections may then have bores therein for receiving the connection bolts used for securing the channel sections together.

The elongate sections or members of the integral component assembly or structure may again have recesses therein for receiving the heads of bolts and some of the transverse sections may be analogous to the bracket-like holders mentioned previously and have slotted recesses for receiving bolt heads.

To aid in locating the component structure the elongate sections may have further recesses which receive location members affixed to the exterior of the side wall.

The invention also provides, in another aspect, a channel section for a scraper-chain conveyor; said channel section comprising side walls interconnected by a floor plate, elongate members mounted to the exterior of at least one of said side walls, said elongate members extending over substantially the length of the side wall and being substantially co-planar with the upper and lower surfaces of said side walls and recess means in the elongate members for permitting at least one attachment to be secured to the side wall.

The invention may be understood more readily and various other features of the invention may become apparent from consideration of the following description.

BRIEF DESCRIPTION OF DRAWINGS.

Embodiments of the invention will now be described, by way of examples only, with reference to the accompanying drawings, wherein.

DESCRIPTION OF PREFERRED EMBODIMENTS

Figure 2:
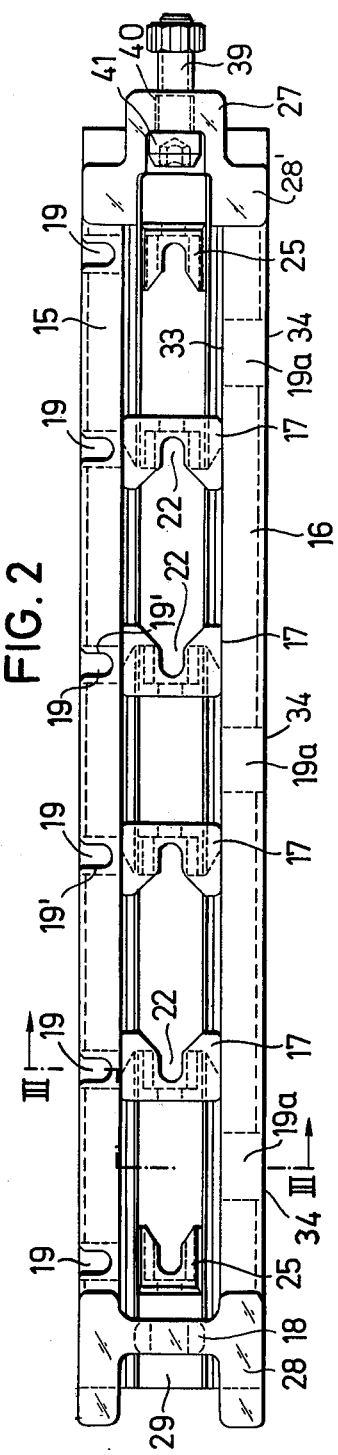
FIG. 2 is a side elevation of another conveyor channel section made in accordance with the invention.
Figure 3:
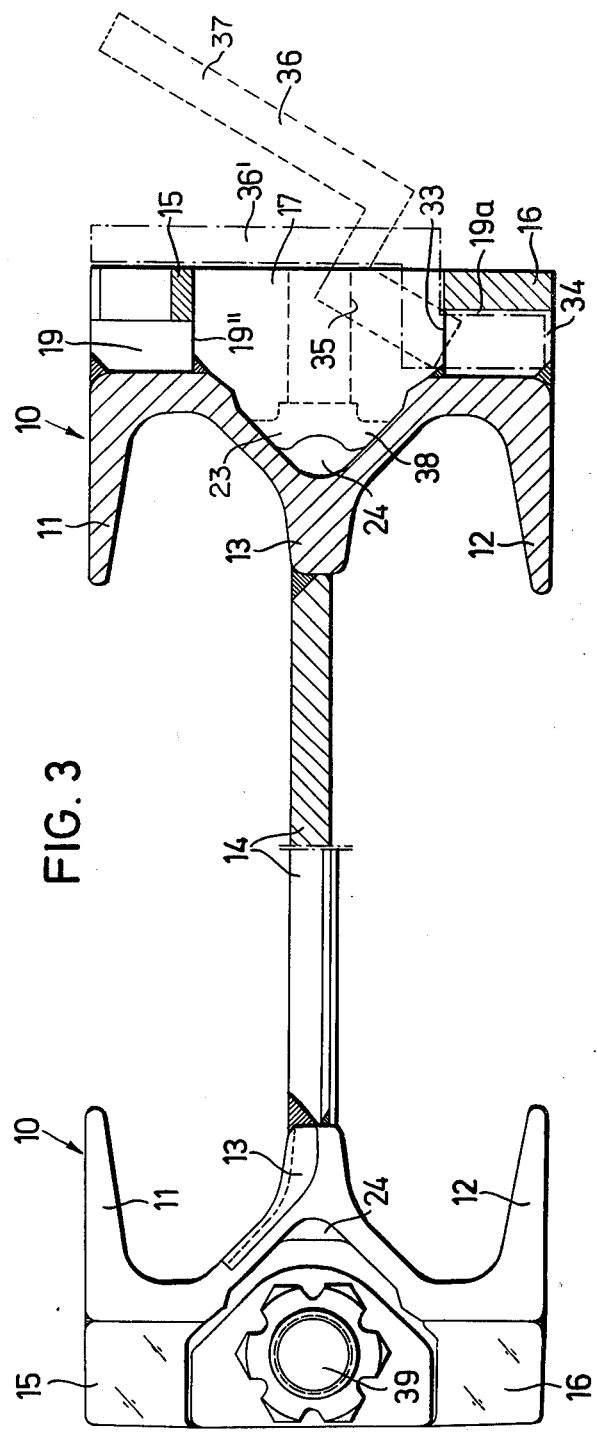
FIG. 3 is a part-sectional end view of the channel section depicted in FIG. 2.

Referring initially to FIGS. 2 and 3, a scraper-chain conveyor channel section or pan is composed, in known manner, of two sigma-shaped side walls 10 each side wall 10 having an upper flange 11 a lower flange 12, a central flange 13 and an external V-shaped groove 24. The flanges 11,12,13 project inwardly and a floor plate 14 extends between the central flanges 13 of the side walls 10 and is welded thereto. As is known the conveyor would employ a plurality of these channel sections arranged end-to-end and a scraper-chain assembly (not shown) would be moved along the channel sections with an upper run moving above the floor plates 14 and a lower run moving beneath the floor plates 14. The scrapers in the upper run of the assembly serve to transfer material along the channel sections over the floor plates 14.

As shown in the drawing each side wall 10 has elongate members in the form of stiffening plates 15,16 attached to its outer face as by welding. Each plate 15,16 is of rectangular or square cross-section and has a length substantially the same as the channel section itself. The uppermost face of each upper plate 15 is co-planar or flush with the upper surface of the associated flange 11 and similarly the lowermost face of each lower plate 16 is co-planar or flush with the lower surface of the associated flange 12.

Each upper plate 15 is provided with a series of pockets or recesses 19 spaced apart along its length. Each recess 19 is open towards both the inner and outer side faces and both the lowermost and uppermost faces of the plate 15. From the outer side face of the plate 15 each recess 19 takes a slot-like form 19' with a semi-circular lower end and material is cut away behind the slot 19', as represented by reference numeral 19"(see FIG. 3), so that the recesses 19 are wider inwardly of the outer side face of the plate 15. This enables the heads of bolts to be introduced into the recesses 19 from the top and to be located and retained therein. Although the bolts are not illustrated it can be appreciated that their shanks would project outwardly beyond the outer side face of the plate 15 to permit accessories such as machine guides or spillage plates to be secured thereto.

Each lower plate 16 is also provided with a series of recesses 19a each open towards the uppermost and lowermost faces and towards the inner side face of the plate 16. The opening of the recesses 19a towards the uppermost and lowermost faces is represented by the reference numerals 33,34 respectively. In the illustrated embodiment three recesses 19a are provided and these recesses are spaced equally along the length of each plate 16. The recesses 19a serve to receive and retain auxiliary attachments 36 each of which has a portion 35 locatable in one of the recesses 19a. As shown in FIG. 3, each attachment is a crank-like structure in side view and has a major portion 37 which extends parallel to the portion 35 and which is offset therefrom by means of a further portion extending perpendicular to the portions 35,37. As represented by the dotted outline in FIG. 3 the portion 35 of the attachment can be inserted from the top into one of the recesses 19a in the lower plate 16 and the attachment can then be swung inwardly towards the channel section to adopt the installed position represented in chain-dotted lines denoted 36'. The attachment when installed in the manner described can engage on the outer face of the upper plate 15 and one or more of the bolts retained by the recesses 19 in the plate 15 can be located through a bore or bores in the major portion 37 of the attachment. In this way the attachments can be rigidly located and clamped to the channel section side wall 10. Since the recesses 19,19a are open towards the bottom as represented by the reference numerals 19",34 in FIG. 3 any dirt which might tend to accumulate in the recesses 19,19a, can fall out onto the floor of the mine working.

To further reinforce the plates 15,16 shaped brackets or holders 17, preferably forged parallel members or components, are welded therebetween and as illustrated in FIG. 2, four such holders 17 are provided in the represented embodiment. Each holder 17 has a projection 38 on its inner side which is shaped to conform with, and engage in, the external V-shaped groove 24 in the channel section side wall 10. The maximum vertical height of the holder 17 is such as to engage within the lowermost face of the upper plate 15 and the uppermost face of the lower plate 16 and the lateral thickness of the holder 17 is adapted so that its external side face is coplanar or flush with the outerside faces of the plates 15,16. The holders 17 are provided with slots 22 in their side edges. The holders 17 are arranged in pairs with the slots 22 of the holders 17 of each pair facing another as shown in FIG. 2. Recesses 23 are formed by undercutting the slots 22, so that in like manner the heads of bolts can be located in the slots 22 in the holders 17 and held therein. In this way one or more spillage plates or other attachments or accessories can be carried by the holders 17.

In addition as shown in FIG. 2 smaller conventional holders 25 are arranged at the ends of the channel section and are welded into the V-shaped grooves 24 of the side wall 10. These holders 25 have a maximum vertical height more or less the same as that of the groove 24 and a thickness somewhat less than the holders 17 to lie flush with the exterior of the side wall 10. These substantially smaller and ligher holders 25 are otherwise formed in a similar manner to the holders 17 and have bolthead receiving slots to assist in the securing of the spillage plates or other accessories or attachments. The reduced thickness of the holders 25 permits bolts 39 used for interconnecting adjacent channel sections together to be introduced. More particularly and in known manner the channel sections are secured together by means of interengaging connectors 28,28' fixed to the channel section ends and having a shell-like projection and recess 27,29. The bolts 39 extend through bores 40,18 in these parts as shown at the right-hand and left-hand side of FIG. 2. In contrast to the conventional type of connectors the connectors 28,28' are of larger and very much stouter construction and each comprises a one-piece component, preferably a casting. The connector 28' is formed with the male projection 27 and the connector 28 is formed with the complementary female recess 29. Because of their increased strength the connectors 28,28' are able to cope with higher loading than the known forms of connectors.

As also known in FIG. 2, the recesses 19 in the plate 15 are located immediately above the holders 17,25 whereas the recesses 19a are located between adjacent holders 17,25.

Figure 1:
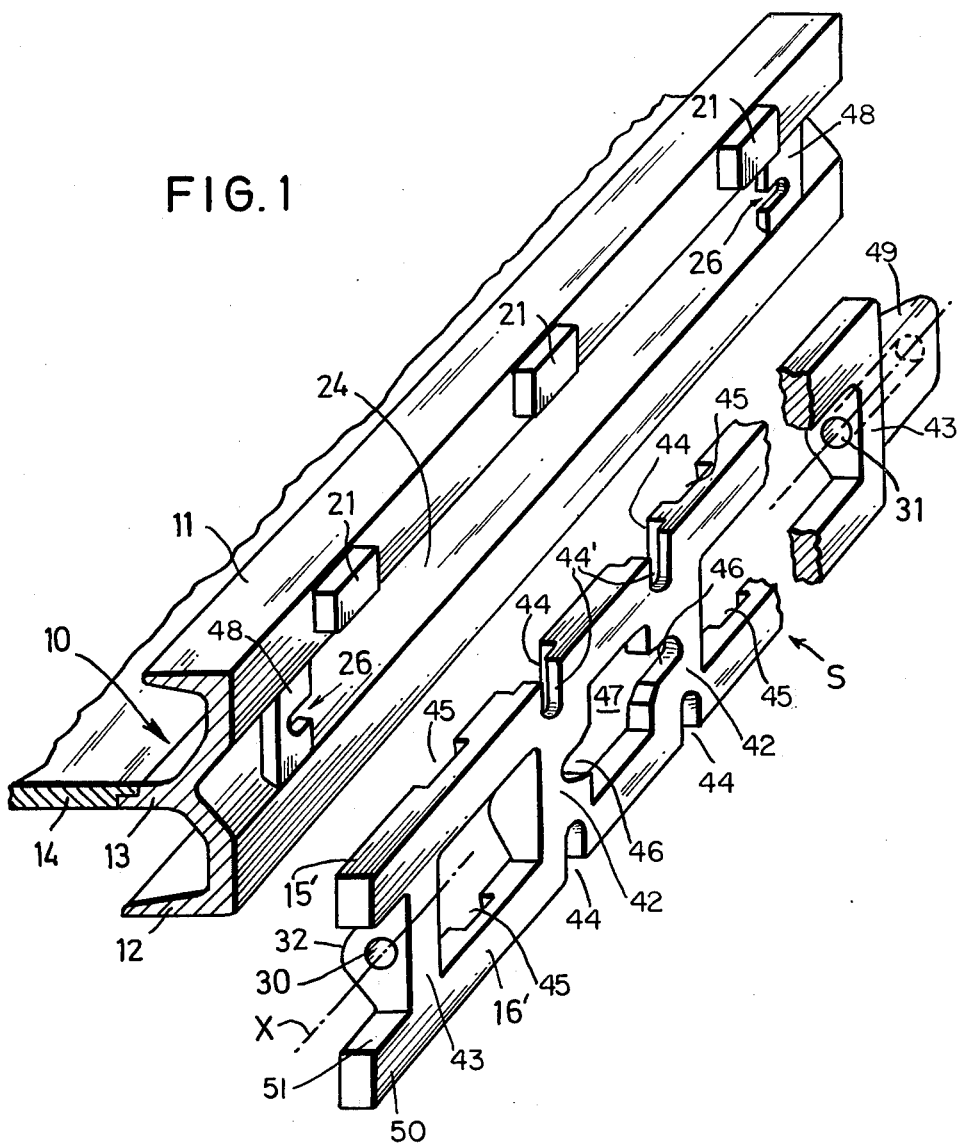
FIG. 1 is a perspective view of part of a conveyor channel section made in accordance with the invention.

The overall construction as described stiffens and reinforces the basic conveyor channel section to a considerable extent. The various elements of the composite construction may be attached individually to the channel section but it is also possible to pre-fabricate the assembly 15,16,17,28,28' and then to weld this assembly to the conveyor channel section side wall. It is also feasible to manufacture the assembly 15,16,28 and 28' and possibly 17 as well as a single workpiece by casting or drop forging, for example and FIG. 1 depicts a modified design where this principle is adopted.

Referring now to FIG. 1, the numeral 10 again denotes a side wall of a conveyor channel section which has an upper flange 11, a lower flange 12 a central flange 13, welded to the floor plate 14 and an external V-shaped groove 24. A one-piece component structure in the form of a drop forging or casting denoted S is symmetrical about a longitudinal centre line X and is adapted to be secured to the side wall 10. The component S can be secured to the side wall 10 by welding or by detachable means such as bolts. Although only one component S is shown in the drawing each side wall 10 of the channel section could have a component S allocated to it. As shown in FIG. 1, the component S has longitudinally extending upper and lower elongate sections 15',16' interconnected by transverse sections 42,43. As can be appreciated from the drawing since the component S is symmetrical about the line X it can be used either way up with either the section 15' or the section 16' at the top. This allows the casting to be mounted on either side wall. When the component S is secured to the side wall 10 in the position shown in the drawing the upper face of the section 15' is co-planar or flush with the upper surface of the flange 11 and similarly the lower face of the section 16' is co-planar or flush with the lower face of the flange 12. Recesses 44 are provided in the section 15' and are spaced along the length thereof. Each recess 44 opens towards the upper and lower faces and to the outer and inner side faces of the section 15'. Each recess 44 takes a slot-like form from the outer side face with a semi-circular lower end. The recesses 44 are cut-away inwardly of the outer face of the member 15' so that the margins of the laterally-outermost portions 44' are closer together thereby permitting the heads of bolts (not shown) to be inserted from the top into the larger regions of each recess 44. The bolts may then be used to secure other accessories such as machine guides or spillage plates. The section 16' is also provided with similar recesses 44 each disposed immediately beneath one of the recesses 44' in the section 15'. The recesses 44 in the members 15',16' are positioned to correspond and align with the intermediate transverse sections 42. Further recesses 45 are also provided in the sections 15',16'. Each recess 45 is open to the inner side face of the section 15',16' and to the upper and lower faces of the section 15',16'. These recesses 45 are spaced along the sections 15',16' and are located between the transverse sections 42,43. Locating members 21 are attached as by welding to the outer side of the wall 10 of the channel section and are adapted to be received in the recesses 45. In the illustrated embodiment the members 21 are in the form of rectangular blocks which are just disposed at the upper region of the side wall 10, i.e. above the groove 24.

The inner faces of the transverse sections 42,43 are shaped as shown to conform and mate with the groove 24. The intermediate or central sections 42 have slots 46 in their facing sides permitting the heads of bolts to be introduced into the space 47 and located in the slots 46. The slots 46 may be cut away at the inside, as with the recesses 44, to receive and retain the bolts heads. These bolts also serve for the attachment of accessories and particularly spillage plates.

The channel section side wall 10 also has plates 48 welded directly into the grooves 24 so as to lie between the transverse sections 42,43 when the component S is assembled or mounted to the wall 10. These plates 48 are also formed with slots 26 to receive the heads of bolts. In a similar manner to the holders 17 described in connection with the embodiment represented in FIGS. 2 and 3, the plates 48 are smaller than the sections 42 and are flush with the external side face of the wall 10. Thus the plates 48 permit connection bolts (not shown) used for interconnecting the channel sections together to be introduced. The connection means which receive these bolts are here formed integrally with the component S and are generally denoted 49,50. The connector 49 at one end of the casting S is in the form of a male projection whereas the complementary connector 50 at the other end of the castings is in the form of a female recessed as at 51 for receiving the projection 49. The endmost transverse sections 43, partly defining or delimiting the connectors 49,50, have inner projections with faces 32 shaped to conform with and engage in the groove 24 and central bores 30,31 in these sections 43,49 receive the aforementioned bolts which secure the connectors 49,50 and hence the channel sections together in the manner described in relation to the construction shown in FIGS. 2 and 3.

We claim:

1. A channel section for a scraper-chain conveyor comprising: side walls having V-shaped notches extending longitudinally along the exterior surfaces thereof; a floor plate extending between and connecting said side walls; an elongate structure mounted on the exterior surface of at least one of the side walls, said structure extending over substantially the entire length of the side wall and being substantially co-planar with the upper and lower surfaces thereof, said structure having vertically spaced upper and lower stiffening members interconnected at longitudinally spaced locations by first holding members extending transversely therebetween, the V-shaped notch in the exterior surface of the side wall being accessible through the spaces between said upper and lower stiffening members and said first holding members, said first holding members being engaged within the elongate V-shaped notch extending along the side wall and having slotted recesses therein for accommodating the heads of bolts used for securing an attachment, said first holding members being substantially co-planar with the exterior sides of said stiffening members; connectors attached to the opposite ends of the side wall, said connectors having complimentary interengageable projections and recesses for connecting one channel section to another, said connectors extending over the entire height of the side walls and being substantially co-planar with the exterior sides of said stiffening members, said connectors having bores for receiving connecting bolts used to secure adjacent channel sections together; and, second holding members provided adjacent to said connectors, said second holding members having slotted recesses serving to receive the heads of bolts and being engaged in the V-shaped notch on the side wall, said second holding members being smaller than said first holding members and having a maximum height substantially the same as the maximum width of the V-shaped notch and a width such that the outermost sides are substantially co-planar with the exterior of the side wall to thereby permit connecting bolts to be located in the connectors.

2. A channel section according to claim 1 wherein a plurality of recesses are provided in said upper stiffening member, said recesses being open towards the top and outer side surfaces of said upper stiffening member and being adapted to accommodate the heads of bolts used for securing an attachment to said structure.

3. A channel section according to claim 1 wherein a plurality of pocket-like recesses are provided in said lower stiffening member, said recesses being open towards the top of said lower stiffening member and serving to receive an attachment.

4. The channel section according to claim 1 wherein said stiffening members and said holding members form a pre-fabricated assembly welded to the side wall.

5. A channel section according to claim 1 wherein said stiffening members and said holding members comprise sections of a one-piece component.

6. A channel section according to claim 5, wherein the one-piece component is symmetrical about a line extending parallel to the longitudinal axis of the associated side wall.

7. A channel section according to claim 5, wherein the one-piece component is formed by casting or drop forging.

8. A channel section according to claim 5, wherein the stiffening members have recesses therein open towards the outer side face of the component and towards the top and bottom thereof, the recesses serving to receive the heads of bolts used for securing the attachment.

9. A channel section according to claim 5, wherein at least some of the holding members are formed with slotted recesses for receiving the heads of bolts used for securing the attachment.

10. A channel section according to claim 5, wherein the stiffening members have recesses on their inner faces adjacent the associated side wall which receive location members on the exterior of the side wall.

11. A channel section according to claim 1, wherein the remainder of the holding members between the endmost sections are also provided with projections which engage in the V-shaped groove of the associated side wall.

* * * * *